United States Patent
Marquette et al.

(10) Patent No.: US 10,405,018 B2
(45) Date of Patent: Sep. 3, 2019

(54) SYSTEM AND METHOD FOR PUBLISHING CONTENT FOR BROADCAST

(71) Applicant: QVC, Inc., West Chester, PA (US)

(72) Inventors: James M. Marquette, Chester, PA (US); Ronald Charest, Coatesville, PA (US); Timothy A. Day, Gladwayne, PA (US); Thomas C. Michales, Montvale, NJ (US); Srikanta Dash, Pasadena, CA (US)

(73) Assignee: QVC, Inc., West Chester, PA (US)

( * ) Notice: Subject to any disclaimer, the term of this patent is extended or adjusted under 35 U.S.C. 154(b) by 50 days.

(21) Appl. No.: 15/804,683

(22) Filed: Nov. 6, 2017

(65) Prior Publication Data
US 2019/0141379 A1  May 9, 2019

(51) Int. Cl.
| | |
|---|---|
| H04N 7/16 | (2011.01) |
| H04N 21/254 | (2011.01) |
| G06Q 10/08 | (2012.01) |
| H04N 21/266 | (2011.01) |
| H04N 21/25 | (2011.01) |
| H04N 21/478 | (2011.01) |

(52) U.S. Cl.
CPC ....... H04N 21/2542 (2013.01); G06Q 10/087 (2013.01); H04N 21/251 (2013.01); H04N 21/26603 (2013.01); H04N 21/47815 (2013.01)

(58) Field of Classification Search
CPC .................................................... H04N 21/44
See application file for complete search history.

(56) References Cited

U.S. PATENT DOCUMENTS

| | | | |
|---|---|---|---|
| 7,024,677 B1 | 4/2006 | Snyder et al. | |
| 9,384,512 B2 * | 7/2016 | McClements, IV | ... G06Q 50/01 |
| 9,865,303 B1 * | 1/2018 | Krahnstoever | ...... H04N 5/7605 |
| 2002/0053078 A1 | 5/2002 | Holtz et al. | |
| 2003/0135857 A1 * | 7/2003 | Pendakur | ............... H04N 7/165 725/61 |

(Continued)

FOREIGN PATENT DOCUMENTS

WO    WO 03/055217 A1    7/2003

OTHER PUBLICATIONS

PCT/US2018/059370; PCT Notification of Transmittal of The Intl. Search Report, Written Opinion of the Intl. Search Authority, and Intl. Search Report (PCT Article 18 and Rules 43 and 44), dated Mar. 14, 2019.

*Primary Examiner* — Gigi L Dubasky
(74) *Attorney, Agent, or Firm* — Baker Botts L.L.P.

(57) ABSTRACT

A system for publishing content for broadcast includes one or more processors. The one or more processors are configured to identify, in response to a user query, one or more video clips of a plurality of video clips stored in one or more storage devices. The one or more processors are further configured to display an indication of the one or more identified video clips and generate, based on a user selection of the one or more identified video clips, a rundown comprising the user-selected video clips. The one or more processors are further configured to determine that each of the user-selected video clips comply with a plurality of broadcasting requirements stored in the one or more storage devices and generate a playlist comprising each of the user-selected video clips of the rundown that comply with the plurality of broadcasting requirements.

16 Claims, 9 Drawing Sheets

(56) References Cited

U.S. PATENT DOCUMENTS

| | | | |
|---|---|---|---|
| 2006/0015904 A1* | 1/2006 | Marcus | G11B 27/034 |
| | | | 725/46 |
| 2007/0186252 A1 | 8/2007 | Maggio | |
| 2008/0120345 A1* | 5/2008 | Duncombe | G06F 3/0482 |
| 2010/0036909 A1* | 2/2010 | Lee | H04L 67/04 |
| | | | 709/203 |
| 2013/0246530 A1* | 9/2013 | Lentzitzky | H04L 65/60 |
| | | | 709/204 |
| 2014/0096162 A1* | 4/2014 | Casey | H04N 21/233 |
| | | | 725/61 |
| 2015/0121418 A1 | 4/2015 | Jain et al. | |
| 2018/0174616 A1* | 6/2018 | Aguilar | G11B 27/031 |

* cited by examiner

FIG. 5

Search Results

505 — Your search criteria returned 9 of 9 results
       515

510a — A290425 - Doll 10 Precision Stick Concealer w/ Brush

| Performance 520a | Recorded Price | 525a | Recorded Show 530a |
|---|---|---|---|
| Sales: $150.00 | Special Price: $29.96 | | Source Code: 17062622   Channel: Beauty iQ |
| $/min: $19.00 | P/RC:FP | | Advance Order:               Show Code: DLC |
| Inv Value: $194,470.36 | EZpay: | | Auto-Delivery: N             Day: MON |
| | S&H: $3.00 | | Host Name: user 1 |
| | BMSM: | | Guest Name: user 2 |
| | Group Item: No | | Program Content Type |

Clips 535a    Duration       In Point        Out Point      Create Date  Expire Date    Eligibility    Eligibility Reason    Notes
180a          00:09:12:28   00:00:00:00   00:09:12:28                   540a  SEP 25, 2017     Y

515

510b — A290425 - Doll 10 Precision Stick Concealer w/ Brush

| Performance 520b | Recorded Price | 525b | Recorded Show 530b |
|---|---|---|---|
| Sales: $90.00 | Special Price: $29.96 | | Source Code: 17062719   Channel: QVC2 |
| $/min: $11.00 | P/RC:FP | | Advance Order:               Show Code: DLC |
| Inv Value: $194,470.36 | EZpay: | | Auto-Delivery: N             Day: TUE |
| | S&H: $3.00 | | Host Name: user 3 |
| | BMSM: | | Guest Name: user 4 |
| | Group Item: No | | Program Content Type |

Clips 535b    Duration       In Point        Out Point      Create Date  Expire Date    Eligibility    Eligibility Reason    Notes
180b          00:07:13:13   00:00:00:00   00:07:13:13                   540b  SEP 9, 2017      Y

FIG. 7

| | Clip Type | Clip Name/Title 715 | Clip Duration 725 | Eligibility 735 | Eligibility Reason | Use Date |
|---|---|---|---|---|---|---|
| 710a / 180c | PROMO | COOKING ON Q JAN 24 SUN | 00:00:30:00 | Y | | |
| 710b / 180d | PROMO | COMPUTER BRAND 2015 | 00:00:30:02 | Y | | |
| 710c / 180e | PROMO | PR AM Style L/R Combo SAT 7a | 00:00:20:00 | Y | | |
| 710d / 180f | PROMO | PR AM Style L/R Combo TDY 7a | 00:00:20:00 | Y | | |

705 — Your search criteria returned 47 of 47 results

SYSTEM AND METHOD FOR PUBLISHING CONTENT FOR BROADCAST

TECHNICAL FIELD

This disclosure relates in general to the broadcasting of content and more particularly to a system and method for publishing content for broadcast.

BACKGROUND

Generally, broadcasting networks distribute media content to a plurality of consumers for a variety of reasons. For example, television networks may broadcast shows or movies for entertainment purposes but may also broadcast national and international news events or information. As another example, television networks may broadcast home shopping content which advertises goods for consumer purchase. The distribution of media content typically requires a number of determinations such as the selection of content for broadcast and the sequence of broadcast for selected content.

SUMMARY OF THE DISCLOSURE

According to one embodiment, a system for publishing content for broadcast includes one or more processors. The one or more processors are configured to identify, in response to a user query, one or more video clips of a plurality of video clips stored in one or more storage devices. The one or more processors are further configured to display an indication of the one or more identified video clips and generate, based on a user selection of the one or more identified video clips, a rundown comprising the user-selected video clips. The one or more processors are further configured to determine that each of the user-selected video clips comply with a plurality of broadcasting requirements stored in the one or more storage devices and generate a playlist comprising each of the user-selected video clips of the rundown that comply with the plurality of broadcasting requirements.

Technical advantages of certain embodiments may include improving the efficiency of underlying computers and network by reducing the amount of information communicated over the network and reducing the time needed to select and/or broadcast content. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIGS. 2-7 are examples of user interfaces displayed by the system of FIG. 1;

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 10, where like numbers are used to indicate like and corresponding parts.

Selecting media content to be broadcast may be challenging for a number of reasons. For example, the amount of available content for broadcast may be large, making it difficult to find and/or choose a particular clip for broadcast. As another example, certain considerations may also affect selection of content for broadcast. One example of a consideration may be whether a particular media clip is of a sufficient duration to fill an open (or otherwise unprogrammed or unplanned) broadcasting slot. As another example, the timing of the last broadcast of a particular media clip may affect whether the particular clip should be broadcast again in the future. As another example, a physical retail inventory of products may affect selection of content for broadcast. As yet another example, rights pertaining to particular media content may change, expire or otherwise lapse, restricting when or how particular content may be distributed. Thus, selecting content for broadcast may be a time-consuming process in which many considerations must be accounted for.

This disclosure contemplates an unconventional system for publishing content for broadcast that accounts for one or more broadcasting requirements that utilize real-time (or near real-time) data. In some embodiments, the unconventional system may present, for user-selection, only content that complies with the one or more broadcasting requirements. In other embodiments, the unconventional system may prevent user-selected content from being broadcast if the content does not comply with one or more broadcasting requirements. As explained above, the unconventional system described herein may be associated with benefits such as improved efficiency and/or reduction in error rates relative to conventional systems.

Figure 1:
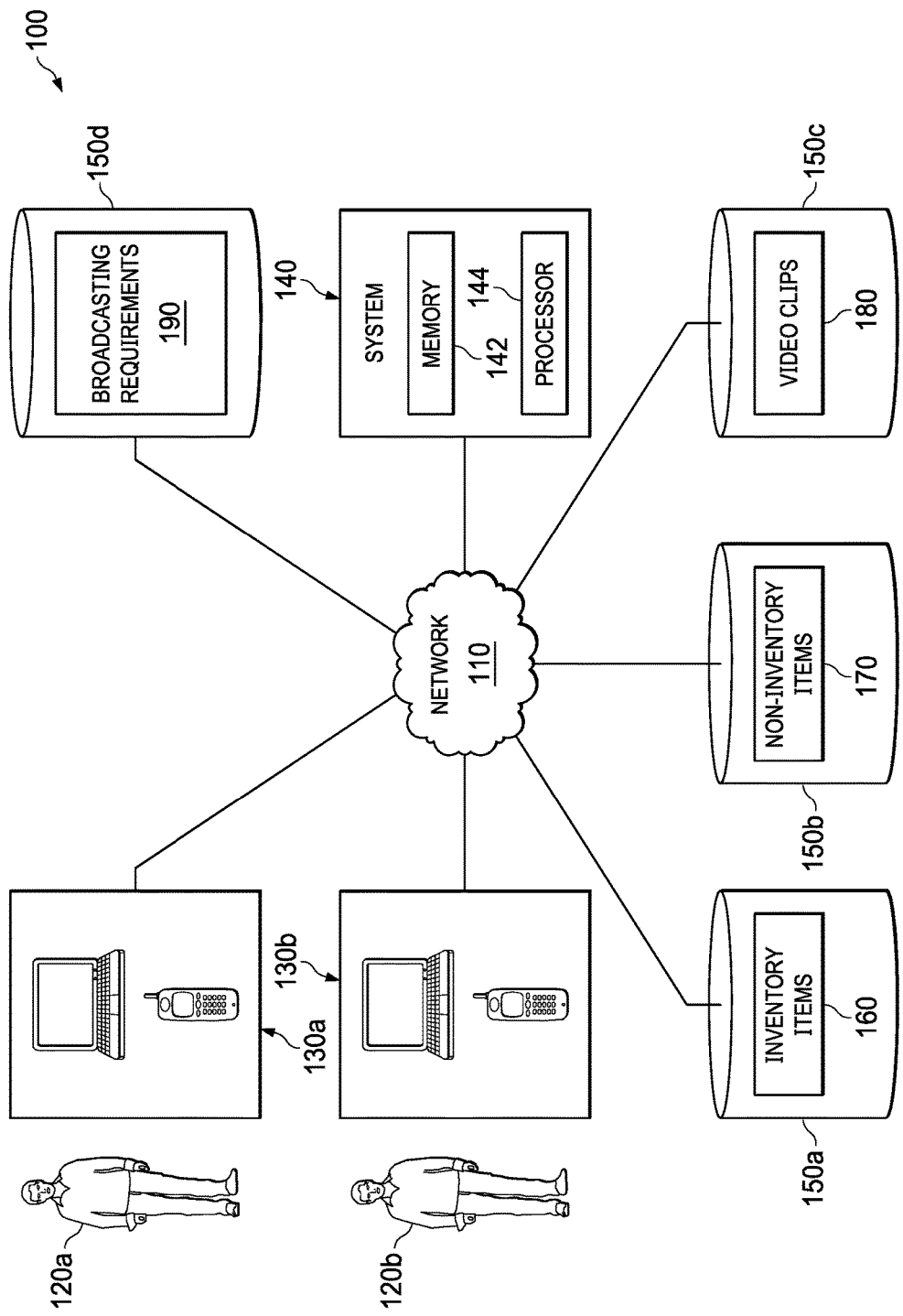
FIG. 1 is a block diagram illustrating a network environment for a system for publishing content for broadcast.

FIG. 1 illustrates a network environment 100 for a system 140 for publishing content for broadcast. As illustrated in FIG. 1, network environment 100 includes a network 110, one or more users 120, devices 130, one or more storage devices 150, and system 140. In some embodiments, system 140 may include one or more storage devices (e.g., memory 142) and a processor 144. Generally, system 140 may publish content for broadcast based on one or more broadcasting requirements. As used herein, a "broadcasting requirement" refers to a requirement that indicates whether a video clip may be broadcast.

Network 110 may facilitate communication between and amongst components of network environment 100. This disclosure contemplates network 110 being any suitable network operable to facilitate communication between the components of network environment 100. For example, network 110 may permit users 120 to interact with system 140. As another example, network 110 may permit users 120 to interact with each other. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As described above, network environment 100 may include one or more users 120 in some embodiments. As depicted in FIG. 1, network environment 100 includes two users 120a and 120b. As is also depicted in FIG. 1, each user 120 is associated with one or more devices 130. For example, user 120a is associated with devices 130a and user 120b is associated with devices 130b. In some embodiments, users 120 use devices 130 to interact with system 140 over network 110. For example, users 120 may use devices 130 to select content for broadcast. In some embodiments, a user's interactions with system 140 may require system 140 to communicate with one or more storage devices 150.

As an example, user 120a may use device 130a to communicate with system 140. User 120a may send a query (e.g., query 805 of FIG. 8) to system 140 over network 110 in connection with a request to generate a rundown (also referred to as a "rundown generation request"). As used herein, a "rundown" is used to describe a listing of one or more media clips (also referred to as video clips) selected by a user 120. In some embodiments, user 120a may define particular characteristics associated with a video clip to facilitate the generation of the rundown. As an example, user 120a may query system 140 for video clips associated with one or more of a particular date, a particular product, a particular source code, a particular show, a particular date, etc. As used herein, a "source code" may refer to a unique identifier for each show and order of product(s) and/or video clip(s) 180. As an example, a source code for a show may be YYMMDDHHOO, where YY refers to a year, MM refers to a month, DD refers to a day, HH refers to hour, and OO refers to a position (or order) of a video clip 180 in a sequence. In response to receiving the user's query, system 140 may identify, based on the characteristics defined by the user, video clips stored in one or more storage devices 150 and send an identification or indication of the identified video clips 180 for display on device 130a of user 120a. In some embodiments, system 140 only sends identifications of those video clips that (1) meet the characteristics defined by the user and (2) comply with one or more broadcasting requirements. In such an embodiment, the video clips 180 (or indications thereof) selected by user 120a for inclusion in their rundown are permitted to be broadcast. As will be explained in further detail below, FIGS. 2-7 are examples of user interfaces that may be displayed on device 130a as user 120a interacts with system 140.

As depicted, network environment 100 also includes one or more storage devices 150. Storage devices 150 may, in some embodiments, be databases configured to store data in an organized manner. FIG. 1 illustrates network environment 100 having four separate storage devices 150, each configured to store different types of data. In other embodiments, network environment 100 may include more or fewer storage devices 150 (e.g., a single storage device 150). As depicted, storage device 150a stores inventory item data 160. Generally, inventory item data 160 refers to data that is associated with a product or item in inventory. Inventory item data 160 may include one or more of a price corresponding to an inventory item, a date associated with an inventory item, an identification of one or more videos corresponding to an inventory item, and a quality of a video corresponding to an inventory item. As an example, storage device 150a may store the following inventory item data 160 about a Product A:

TABLE 1

| Examples of Types of Inventory Item Data 160 | Product A |
|---|---|
| Present Quantity in Inventory of Product A | 25 units |
| Product Number of Product A | 1000A |
| Identification of Video Clips Featuring Product A | A0001; A0002 |
| First Air Date of Video Clips Featuring Product A | A0001: Jul. 21, 2016<br>A0002: Aug. 21, 2016 |
| Sale Price of Product A | $72.99 |
| Clearance Price of Product A | $59.99 |
| Shipping & Handling Price of Product A | $4.99 |
| Quality of Video Clips Featuring Product A | A0001: bad<br>A0002: very good |
| Expiration Date of Video Clips Featuring Product A | A0001: Jul. 21, 2017<br>A0002: Aug. 21, 2017 |
| Last Air Date of Video Clips Featuring Product A: | A0001: Mar. 21, 2017<br>A0002: Aug. 21, 2016 |

As illustrated in TABLE 1 above, Product A is associated with an inventory quantity of 25 units, two video clips (A0001, A0002), particular pricing, and video clip dates. Although particular types of inventory item data 160 have been described and disclosed, this disclosure recognizes that inventory item data 160 may comprise any suitable data associated with an item in inventory.

Storage device 150b is configured to store non-inventory item data 170 as illustrated in FIG. 1. Generally, non-inventory item data 170 refers to data that is not associated with a product or item in inventory. In some embodiments, non-inventory item data 170 includes data about products or services not available for sale through the network that is broadcasting content. As an example, storage device 150b may store the following non-inventory item data 170 about a Service A:

TABLE 2

| Examples of Types of Non-Inventory Item Data 170 | Service A |
|---|---|
| Identification of Video Clips Featuring Service A | SA0001; SA0002; SA0003 |
| Last Air Date of Video Clips Featuring Service A | SA0001: Nov. 30, 2016<br>SA0002: Jul. 21, 2017<br>SA0003: May 30, 2017 |
| Duration of Video Clips Featuring Service A | SA0001: 00:00:37<br>SA0002: 00:01:01<br>SA0003: 00:00:32 |
| Expiration Date of Video Clips Featuring Service A | SA0001: Mar. 30, 2016<br>SA0002: Aug. 30, 2017<br>SA0003: Nov. 30, 2017 |

As illustrated in TABLE 2 above, Service A is associated with three video clips 180 (SA0001, SA0002, SA0003), each having a different duration, first air date, and expiration date. In some embodiments, video clips 180 associated with non-inventory item data 170 are included in one or more rundowns (e.g., rundown 815 of FIG. 8) generated by system 140. In some embodiments, a video clip associated with non-inventory item data 170 is a commercial that is broadcast between other video clips 180 (e.g., video clips associated with an item in inventory). Although particular types of non-inventory item data 170 have been described and disclosed, this disclosure recognizes that non-inventory item data 170 may comprise any suitable data not associated with an item in inventory.

As illustrated in FIG. 1, storage device 150c is configured to store video clips 180. Video clips 180 may be media files (e.g., video files) associated with inventory items and/or non-inventory items. For example, one or more of video clips 180 may be a video clip associated with a product or item in inventory. As another example, one or more of video clips 180 may be a video clip associated with a product or item not in inventory. In some embodiments, video clips 180 include each video clip identified in inventory item data 160 and/or non-inventory item data 170. For example, video clips 180 may include one or more of video clips A0001, A0002, SA0001, SA0002, and SA0003 described above.

In some embodiments, network environment 100 includes a storage device 150d that stores one or more broadcasting requirements 190. As described above, a broadcasting requirement may be a requirement that indicates whether a video clip may be broadcast. In some embodiments, broadcasting requirements 190 are pre-defined by a manufacturer (e.g., manufacturer of system 140). In other embodiments, broadcasting requirements 190 are defined and/or updated by user 120. TABLE 3 below illustrates examples of various broadcasting requirements:

TABLE 3

| 1 | quantity of item in inventory is greater than 50 |
| 2 | last air date of video clip is greater than 14 days |
| 3 | price of item in inventory is greater than $9.99 |
| 4 | expiration date of video clip has not passed |

In some embodiments, system 140 uses one or more broadcasting requirements 190 to determine whether a video clip is eligible to be identified for rundown purposes and/or broadcast. As an example, broadcasting requirement 1 identified in TABLE 3 above requires that a video clip associated with an item in inventory be greater than 50 in order for the video clip to meet the requirement. In some embodiments, system 140 may apply broadcasting requirement 1 when determining whether to identify a video clip as a potential rundown candidate or otherwise determining whether the video clip can be broadcast. As an example, system 140 may not identify video clips A0001 or A0002 as eligible for broadcast based on broadcasting rule 1 of TABLE 3 above.

In some embodiments, system 140 determines whether a video clip is eligible to be broadcast based on one or more applicable stored broadcasting requirements 190. In such embodiments, system 140 is configured to determine which broadcasting requirements 190 are applicable based on whether a video clip is associated with an inventory item or a non-inventory item. For example, system 140 may determine that broadcasting requirements 1-4 from TABLE 3 above apply when a video clip is associated with an inventory item but that only broadcasting requirements 2 and 4 apply when a video clip is associated with a non-inventory item. For example, system 140 may determine, on Jul. 28, 2017, that video clips A0002 and SA0003 are the only video clips 180 stored in storage device 150c that are eligible for broadcast. In such an example, system 140 would not identify video clips A0001, SA0001, or SA0003 in response to a user query in connection with the generation of a rundown.

Although FIG. 1 depicts storage devices 150 being physically separate from system 140, this disclosure recognizes that system 140 may include one or more storage devices 150 that are configured to store one or more of the types of data illustrated in FIG. 1. For example, system 140 may include one or more storage devices 150 configured to store inventory item data 160, non-inventory item data 170, and broadcasting requirements data 190 (see e.g., FIG. 8). Thus, this disclosure recognizes that system 140 may include, or otherwise be communicably coupled to, one or more storage devices 150 storing the data and/or media content described above and illustrated in FIG. 1.

Figure 2:
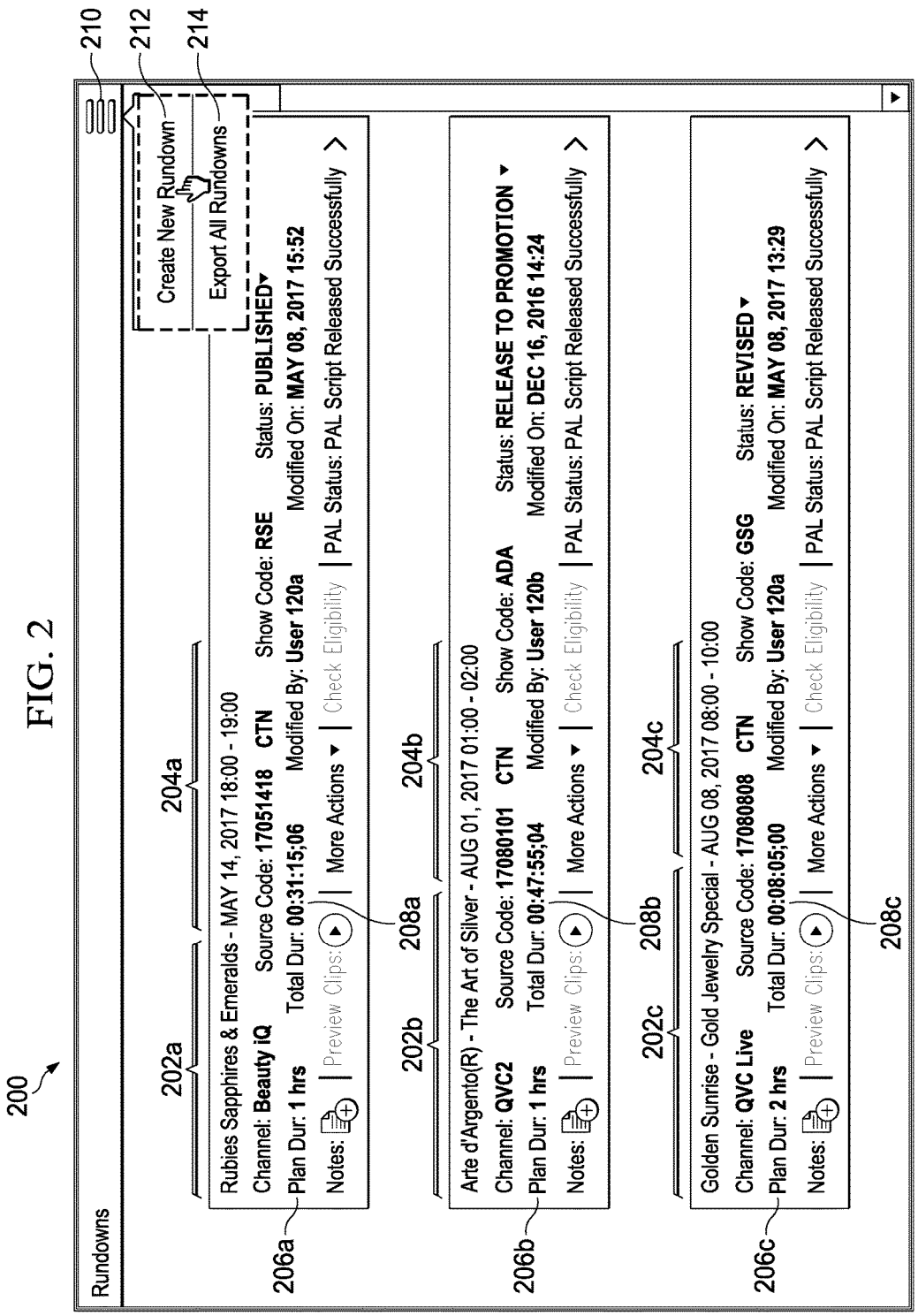

FIGS. 2-5 are examples of user interfaces that may be displayed on user devices 130. Turning first to FIG. 2, user interface 200 (also referred to as "rundown listing interface 200") illustrates a listing of rundowns that have previously been created by one or more users 120. As shown in FIG. 2, each rundown may be associated with a rundown title 202, a broadcast date and time 204, a planned duration 206, and a total duration 208. For example, the rundown entitled "Rubies Sapphires & Emeralds" is planned for broadcast on May 14, 2017 between 6:00 p.m. and 7:00 p.m. Additionally, the "Rubies Sapphires & Emeralds" rundown has a total duration of 31 minutes, 15 seconds, and 6 milliseconds and a planned duration of 1 hour. The rundown listing interface 200 illustrates two other generated rundowns: one entitled "Arte d'Argento®—The Art of Silver" (202b) and another entitled "Golden Sunrise—Gold Jewelry Special" (202c). Each rundown 202b-c is associated with a respective broadcast date and time 204b-c, a planned duration 206b-c, and a total duration 208b-c.

Additionally, rundown listing interface 200 may include other features such as the ability to preview the video clips included in each of the generated rundowns and a notes feature permitting users 120 to include notes about each rundown. The rundown listing interface 200 illustrated in FIG. 2 also includes a menu icon 210 that presents additional action functions to user 120 once selected. As illustrated in FIG. 2, the action functions presented upon selection of menu icon 210 include a "create new rundown" option 212 and an "export all rundowns" option 214. In some embodiments, selecting the "create new rundown" option 212 presents one or more additional user interfaces on user device 130 which permit user 120 to create a new rundown. As an example, user interfaces 300, 400, and 600 of FIGS. 3, 4, and 6 may be presented upon selection of the "create new rundown" option 212. In some other embodiments, selection of the "export all rundowns" option 214 results in the exportation of each rundown presented in user interface 200 to a file that may be saved locally on user device 130 and/or to a network storage device (e.g., storage device 150). Although this disclosure describes certain information and functionality associated with rundown listing interface 200, interface 200 may include any suitable information or functionality about a generated rundown, including a show code, a status, an identification of the user 120 that generated or last modified a rundown, and last modification date.

Figure 3:
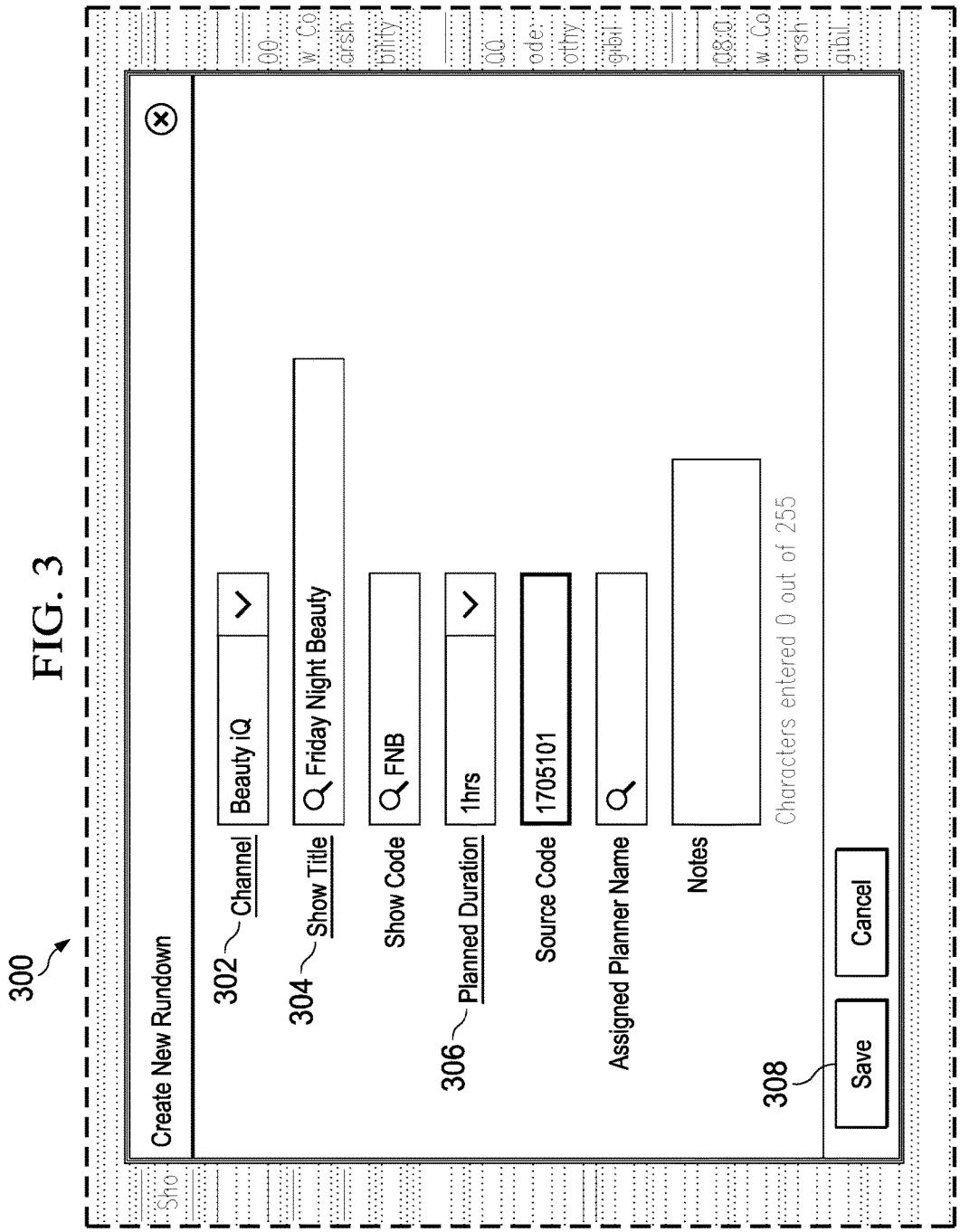

FIG. 3 illustrates an example of a user interface 300 that may be displayed on user device 130 in response to selection of the "create new rundown" option 212 of FIG. 2. As illustrated, user interface 300 may include information about a rundown to be created by user 120. For example, user interface 300 permits user 120 to define a channel 302 that will be associated with the rundown to be created by user 120, a show title 304 that will be associated with the rundown to be created by user 120, and a planned or expected duration 306 of the rundown to be created by user 120. As illustrated in FIG. 3, user interface 300 also includes options for a user 120 to define a show code, a source code, an assigned planner (user) name, and notes associated with the rundown to be created by user 120. In some embodiments, the information input by user 120 on interface 300 will be saved by system 140 and displayed when interface 200 is next presented on user device 130. As an example, interface 200 may be updated to reflect an additional rundown entitled "Friday Night Beauty" to be broadcast on the "Beauty iQ" channel, the rundown having a planned duration of one hour. In some embodiments, the information input by user 120 on user interface 200 is stored to one or more storage devices of system 140 in response to user 120 selecting the "save" button 308. In some embodiments, selection of "save" button 308 causes an additional interface (e.g., interface 400 or 600 of FIGS. 4 and 6, respectively) to be displayed on user device 130.

Figure 4:
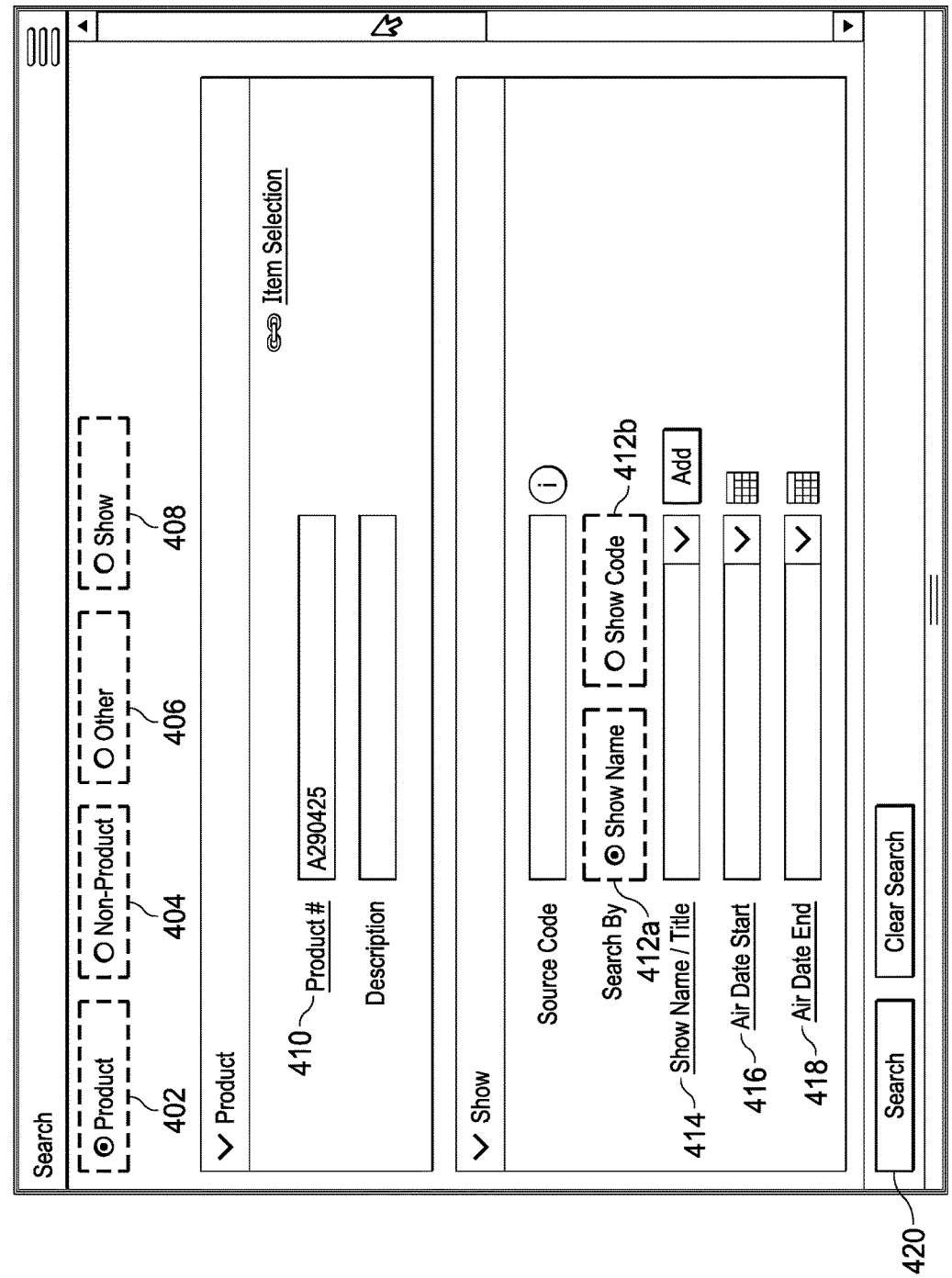
Figure 6:
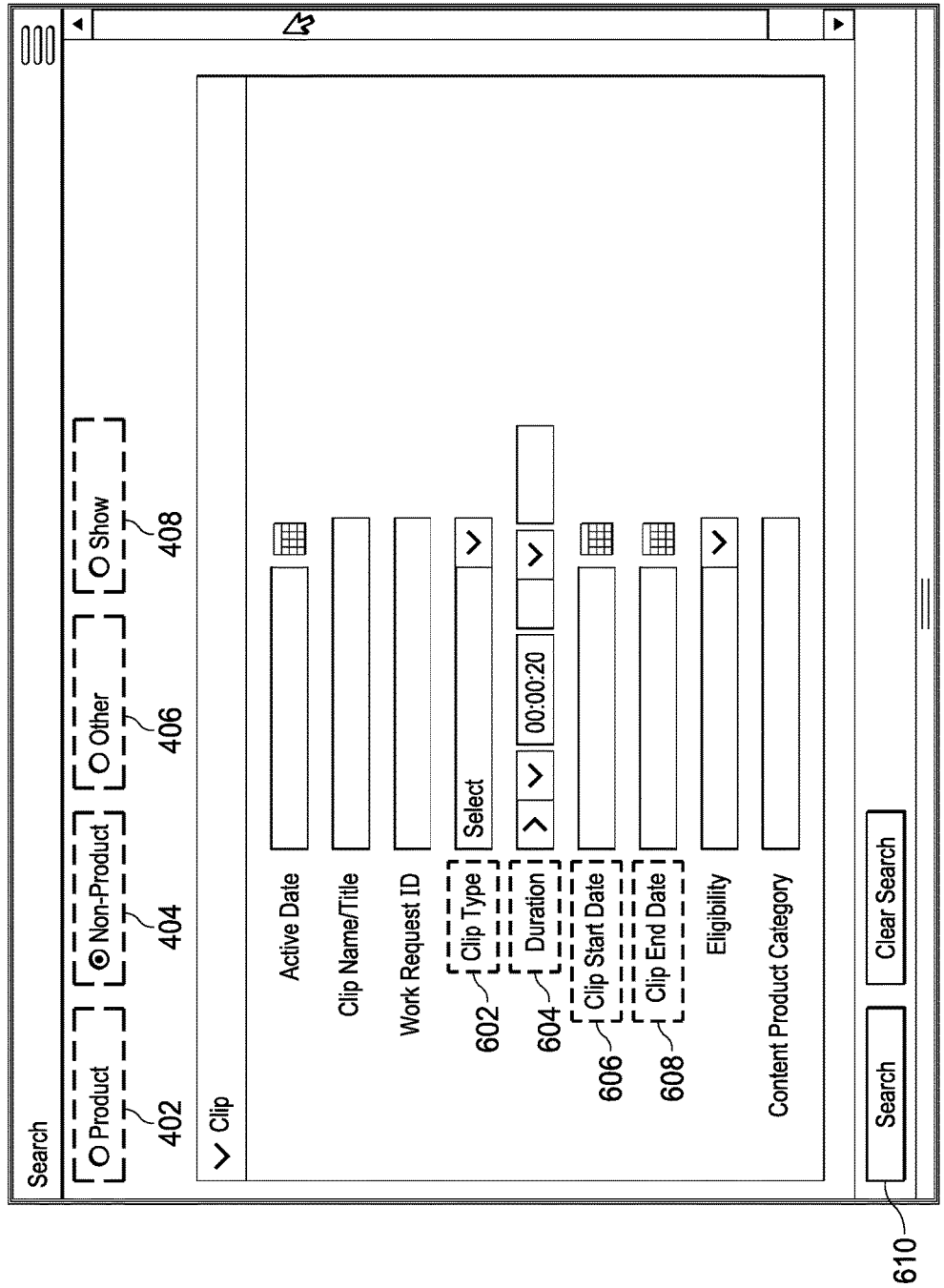

FIGS. 4 and 6 illustrate examples of user interfaces 400 and 600, respectively that may be presented to user 120 on user device 130 in response to user-selection of "save" button 308 on interface 300. User interfaces 400 and 600 are search interfaces that may permit user 120 to define characteristics about video clips 150 to be included in the rundown being created. FIG. 4 illustrates a search interface that is configured to receive characteristics about video clips 150 associated with products or items in inventory (see "product" radio button selected in FIG. 4). If user 120 instead desired to search for video clips not associated with items in inventory, user 120 may select another radio button (e.g., the "non-product" radio button 404, the "other" radio button 406, or the "show" radio button 408). This disclosure recognizes that the selection of another radio button from search interface 400 may result in the display of a different search interface. For example, selection of "non-product" radio button 404 may cause user device 130 to display search interface 600 of FIG. 6. As illustrated in FIGS. 4 and 6, user 120 may define characteristics about video clips 150 associated with items in inventory (by selecting the "product" radio button 402) and/or video clips associated with items not in inventory (by selecting the "non-product" radio button 404). Although this disclosure describes and depicts only two search interfaces (interfaces 400 and 600), this disclosure recognizes that user device 130 may display any suitable search interface.

Interface 400 of FIG. 4 permits user 120 to input or define search characteristics about a video clip associated with an item in inventory. As illustrated in FIG. 4, user 120 may specify a number of characteristics about an item in inventory, including a product number 410, and depending on whether the "show name" radio button 412a or "show code" radio button 412b is selected, a show name/title 414 or show code (not illustrated), and a start air date 416 and an end air date 418 associated with a show title or show code. As illustrated in FIG. 4, user 120 may define a product number (e.g., "A290425") in the product number field 410. After entering search criteria in interface 400, user 120 may select the "search" button 420, which may prompt system 140 to query storage devices 150 for video clips 180 that match or substantially match the search criteria entered by user 120.

FIG. 5 illustrates an interface 500 showing the search results returned from the search criteria input by user 120 on interface 400. As illustrated in FIG. 5, interface 500 includes a search result summary 505 and query hits 510. Search result summary 505 describes a total number of hits returned from the search criteria defined on interface 400. As shown in FIG. 5, a search for product number A290425 returned nine hits. In some embodiments, the product number is associated with a product title 515. As illustrated in FIG. 5, product title 515 for product number A290425 is "Doll 10 Precision Stick Concealer w/ Brush." In some embodiments, each query hit 510 comprises details about a corresponding video clip 180. As illustrated in FIG. 5, query hit 510a comprises details about video clip 180a and query hit 510b comprises details about video clip 180b. Although video clips 180a-b are both associated with product number A290425 and have similar pricing information 525, these video clips 180 differ in a number of ways. For example, show information 530a-b reveal that video clips 180a-b were played on different channels and are assigned different source code numbers. As another example, video clips 180a-b differ in their duration 535 and expiration date 540. As depicted in FIG. 5, query hit 510 may comprise any suitable information including but not limited to historical performance data 520.

Interface 600 of FIG. 6 permits user 120 to input or define search characteristics about a video clip associated with an item not in inventory. The input fields presented on interface 600 may be different from the input field presented on interface 400. For example, user 120 may define search characteristics for one or more of the search fields illustrated in FIG. 6 (e.g., clip type 602, duration 604, clip start date 506, clip end date 508). As illustrated in FIG. 6, user 120 defines a duration of greater than 20 seconds in duration field 604. After entering search criteria in interface 600, user 120 may select the "search" button 610, which may prompt system 140 to query storage devices 150 for video clips 180 that match or substantially match the search criteria entered by user 120. FIG. 7 illustrates an interface 700 showing the search results returned from the search criteria input by user 120 on interface 600.

FIG. 7 illustrates an interface 700 showing the search results returned from the search criteria input by user 120 on interface 600. As illustrated in FIG. 7, interface 700 includes a search result summary 705 and query hits 510. Search result summary 705 describes a total number of hits returned from the search criteria defined on interface 600. As shown in FIG. 7, a search for a video clip 180 associated with a non-inventory item 170 and having a duration of greater than 20 seconds returned 47 hits. FIG. 7 illustrates an example of the first four query hits 710a-d. In some embodiments, each query hit 710 comprises details about a corresponding video clip 180. As illustrated in FIG. 5, query hit 710a comprises details about video clip 180c, query hit 710b comprises details about video clip 180d, query hit 710c comprises details about video clip 180e, and query hit 710d comprises details about video clip 180f. As illustrated in FIG. 7, video clips 180c-f may be associated with particular clips names/titles 715, particular durations 725, and particular eligibility statuses 735. Although certain types details corresponding to each query hit 710 have been described above, query hit 710 may comprise any suitable information including but not limited to eligibility reason and use dates.

Figure 8:
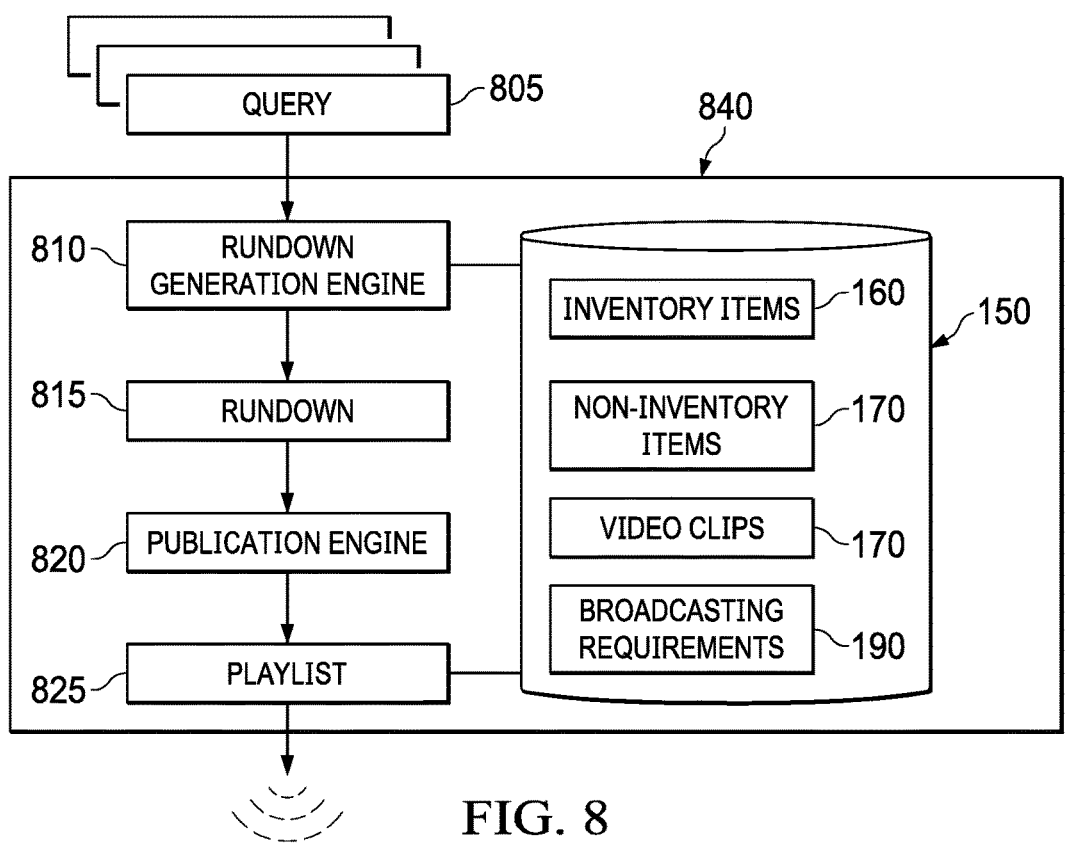
FIG. 8 is a block diagram illustrating an embodiment of the system of FIG. 1, according to certain embodiments of the present disclosure.

FIG. 8 illustrates an example embodiment of system 140. As illustrated, system 140 includes a rundown generation engine 810, a publication engine 820, and storage device 150. In some embodiments, modules 810 and 820 are executable software. In other embodiments, modules 810 and 820 are hardware. In yet other embodiments, modules 810 and 820 are a combination of software and hardware. Generally, rundown generation engine 810 is configured to receive one or more queries 805 from user 120 and generate a rundown 815 based on the queries. Publication engine 820 is generally configured to receive a rundown 815 and generate a playlist 825 for broadcast based on rundown 815.

As illustrated in FIG. 8, system 140 may include rundown generation engine 810 which is communicably coupled to storage device 150. Although FIG. 8 depicts system 140 including storage device 150 that stores the data that is used by rundown generation engine 810, this disclosure recognizes that system 140 need not include storage device 150. Rather, rundown generation engine 810 may instead be communicably coupled to one or more storage devices 150 that store the data to be used by rundown generation engine 810. An example of such an embodiment is depicted in FIG. 1. Rundown generation engine 820 may be configured to receive one or more queries 805 from user 120 over network 110 and generate rundowns 815 based on the one or more queries 805. Queries 805 from user 120 may include any suitable interaction between user 120 and system 140. In some embodiments, queries 805 are rundown creation requests discussed above in reference to FIG. 3.

In some other embodiments, query 805 may be a search request associated with a particular rundown creation request as discussed above in reference to FIGS. 4-7. For example, query 805 may be the search query resulting from user-selection of the "search" action button on interface 400. As a result of user 120 selecting the "search" action button, system 140 may perform a search through the contents of storage device 150 to identify one or more video clips 180 that match or substantially match the criteria input by user 120. As used herein, "substantially match" may refer to matching at least 70% or more of the search criteria input by user 120.

As described above, system 140 may, in some embodiments, only identify those video clips 180 that comply with broadcasting requirements 190. As such, rundown generation engine 810 may be configured to receive query 805 from user 120 and identify video clips 180 based on query 805. Rundown generation engine 810 may further be configured to determine, for each video clip 180 identified based on query 805, whether the video clip 180 complies with broadcasting requirements 190 and present on user device 130 an identification of each video clip that complies with broadcasting requirements 190. Rundown generation engine 810 may be further configured to receive a selection of a presented identification of a video clip 180 from user device 130 and add each video clip 180 associated with a selected identification to an associated rundown. In this manner, rundown 815 will only include those video clips 180 that comply with broadcasting requirements 190 at the time rundown 815 is generated.

The following is an example of an algorithm that may be executed by rundown generation engine 210: (1) receive, from user device 130, a first query 805 requesting to create a first rundown 815; (2) receive a second query 805 requesting an identification of video clips 180 associated with a product number (e.g., product number 1000A); (3) query inventory item data 160 for an identification of video clips 180 associated with the product number; (4) identify, within storage device 150, video clips 180 associated with the product number (e.g., video clips A0001 and A0002); (5) determine, by applying applicable broadcasting requirements 190 (e.g., broadcasting requirements 190 applicable to items in inventory), whether each of the identified video clips comply with broadcasting requirements 190; (6) upon determining that a first video clip complies with broadcasting requirements 190 and that a second video clip does not comply with broadcasting requirements 190, communicate, to user device 130, an identification of the first video clip but not the second video clip (7) upon user selection of an identification of the first video clip, add the first video clip to the first rundown 815.

In some embodiments, rundown 815 includes only a single video clip 180. In other embodiments, rundown 815 includes multiple video clips 180. As discussed above, rundown 815 may include video clips 180 associated with items in inventory and/or items not in inventory. As an example, rundown 815 may include two video clips 180 associated with items in inventory and one video clip not associated with an item in inventory (e.g., an advertisement). This disclosure recognizes that a video clip not associated with an item in inventory may be a commercial for a product, service, or company for which a broadcast network may collect revenue.

Rundown 815 may, in some embodiments, be associated with a specified broadcast date and/or time. The broadcast date and/or time may be automatically assigned by system 140 and/or set by user 120. As an example, system 140 may automatically assign a broadcast date and/or time to be the first available broadcast date and/or time. As another example, user 120 may assign a broadcast date and/or time to rundown 815 at the time of the rundown creation request. As yet another example, user 120 may assign a broadcast date and/or time at some point after rundown 815 has been generated by rundown generation engine 810. In some embodiments, the user 120 who created the rundown 815 is different than the user 120 who assigns the broadcast date and/or time.

In some embodiments, rundown 815 may include one or more alternative video clips 180. As used herein, an alternative video clip 180 refers to a video clip 180 that may replace, in rundown 815, one or more user-selected video clips 180 that are determined to not be in compliance with broadcasting requirements 190. In some embodiments, user 120 may select and indicate whether a video clip 180 is an alternative video clip. In other embodiments, system 140 automatically selects one or more alternative video clips 180 based on search criteria included in query 205. For example, system 140 may select the video clip 180 associated with the second search result option on interface 600 as an appropriate alternative video clip for the video clip associated with the first search result selected by user 120.

As described above, system 140 may also include publication engine 820. Generally, publication engine 820 is configured to receive rundown 815, perform one or more checks on rundown 810, and generate a playlist 825. As used herein, a "playlist" refers to a rundown 815 comprising video clips 180 that are compliant with broadcasting requirements 190 and is ready for broadcast. As will be described in more detail below, playlist 825 may include the same or different video clips 180 as rundown 815 generated by rundown generation engine 810. In some embodiments, a playlist is set for broadcast at a particular broadcast time and/or date that may be specified by user 120 or system 140.

Although this disclosure describes and depicts publication engine 820 receiving rundown 815 from rundown generation engine 810, this disclosure recognizes that publication engine 820 may receive rundown 820 from any suitable component of network environment 100. For example, this disclosure recognizes that each rundown 815 generated by rundown generation engine 810 may be stored in one or more storage devices 150 accessible to system 140. In such an embodiment, publication engine 820 may receive rundown 815 from the one or more storage devices 150. Accordingly, this disclosure recognizes that publication engine 820 may be communicably coupled to one or more storage devices that are configured to store rundowns 815.

In some embodiments, the one or more checks performed by publication engine 820 include a compliance check, wherein publication engine 820 determines whether each video clip 180 in rundown 815 complies with broadcasting requirements 190. A compliance check may be beneficial because various factors may have changed since rundown 815 was generated. As an example, at the time rundown 815 was generated, a video clip 180 associated with an item in inventory may have had sufficient inventory quantity to be in compliance with broadcasting requirements 190. However, at a later time after rundown 815 was created, the inventory quantity may be reduced to a quantity below an amount required by broadcasting requirements 190. As another example, a video clip 180 associated with an expiration date may have expired since rundown 815 was originally generated. As yet another example, a video clip 180 of rundown 815 may have been broadcast since rundown 815 was originally generated (e.g., because the same video clip 180 was included in a different rundown 815) and thus is no longer in compliance with a broadcasting requirement 190 related to last broadcast date. As such, publication engine 220 may perform a compliance check on rundown 815 to ensure each video clip 180 in rundown 815 remains in compliance with broadcasting requirements 190.

In some embodiments, publication engine 820 uses data stored in one or more storage devices 150 in order to perform the one or more checks discussed above. Accordingly, this disclosure recognizes that publication engine 820 is communicably coupled to one or more storage devices 150 that store one or more of broadcasting requirements 190, inventory item data 160, non-inventory item data 170, and video clips 180. Publication engine 820 may use broadcasting requirements 190 in conjunction with inventory item data 160 and/or non-inventory item data 170 in order to determine whether a video clip 180 in rundown 815 is compliant with broadcasting requirements 190.

In some embodiments, publication engine 820 is communicably coupled to video clips 180 in order to determine alternative video clips for a particular rundown 815. For example, in response to determining that a video clip 180 in rundown 815 is not compliant with broadcasting requirements 190, publication engine 220 may retrieve, an alternative video clip 180, from storage device 150, and replace the non-compliant video clip 180 in rundown 815 with the alternative video clip 180. Accordingly, publication engine 820 can update rundown 815 to include compliant video clips 180. As described above, alternative video clips 180 may be selected by user 120 and/or system 140. This disclosure recognizes that both rundown generation engine 810 and publication engine 820 may be configured to select a suitable alternative video clip 180 for a user-selected video clip 180.

In some embodiments, publication engine 820 performs one or more compliance checks on rundown 815 periodically after rundown 815 is generated (e.g., once per week). In other embodiments, publication engine 820 performs a compliance check on rundown 815 at a particular time. As an example, publication engine 820 may be configured to perform a compliance check on rundown 815 at a particular time (e.g., 2 weeks, 2 days, 2 hours, 2 minutes) prior to a broadcast time and/or date associated with rundown 815.

An example algorithm for publication engine 820 may include: (1) receive rundown 815 comprising one or more video clips 180; (2) determine, for each video clip 180 included in rundown 815, whether the video clip 180 complies with applicable broadcasting requirements 190; (3) in response to determining that a video clip 180 of rundown 815 does not comply with applicable broadcasting requirements 190, substitute the non-compliant video clip 180 with an alternative video clip 180 to generate an updated rundown 815; and (4) after determining that each video clip 180 in the updated rundown 815 is compliant with applicable broadcasting requirements 190, generate a playlist 825 for broadcast that includes each video clip 180 in the updated rundown.

Although not depicted, system 140 (or a component thereof) may be further configured to store published playlists to a storage device 150 of network environment 100. As an example, after generating playlist 825 for broadcast, publication engine 820 may store, or cause to be stored, the generated playlist 825 in a video server (not depicted) of network environment 100. At some point thereafter, playlist 825 may be broadcast from, or retrieved from for broadcast, the video server at which playlist 825 is stored.

Figure 9:
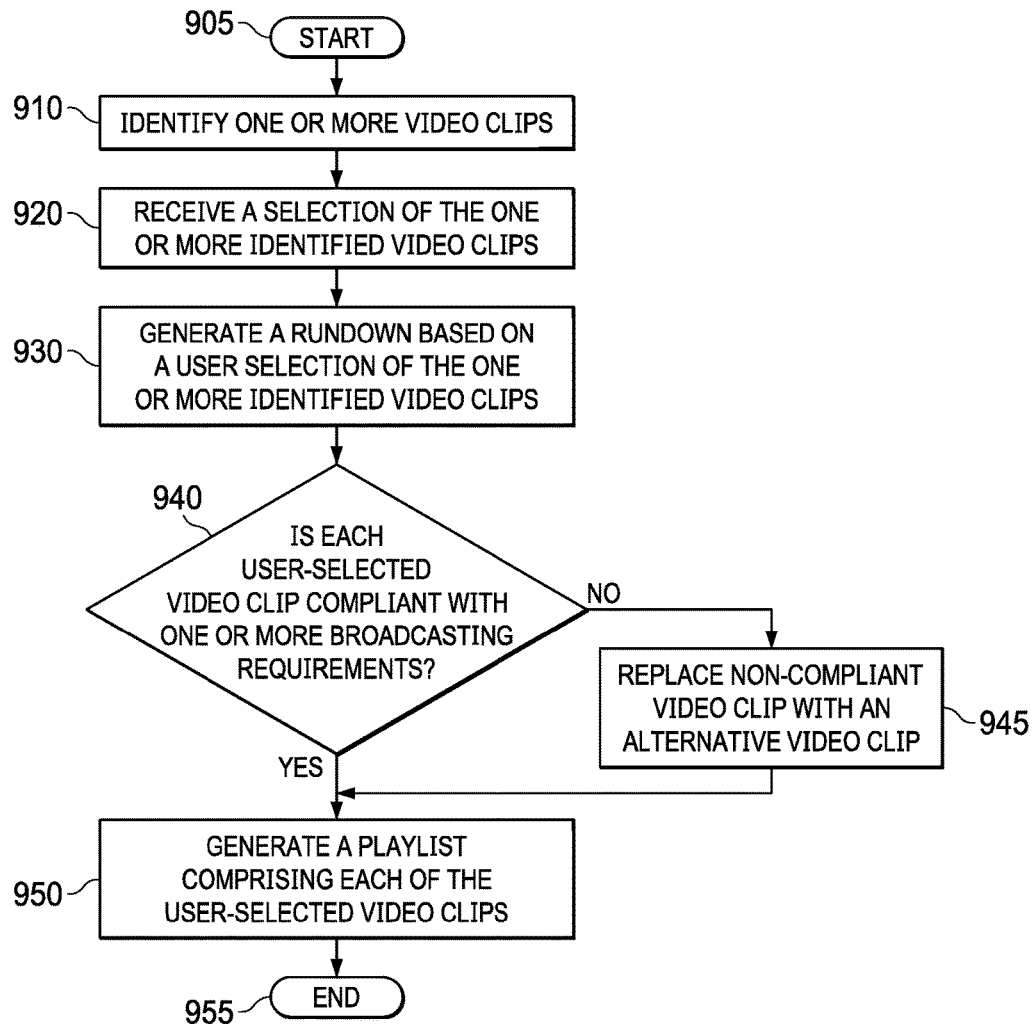
FIG. 9 is a flow chart illustrating a method for publishing content for broadcast, according to one embodiment of the present disclosure.

FIG. 9 illustrates an example method 900 which may be performed by system 140. In some embodiments, some or all of the steps of method 900 are performed by one or more modules of system 140. As an example, some steps of method 900 may be performed by rundown generation engine 810 and some other steps of method 900 may be performed by publication engine 820. In some embodiments, one or more of the steps of method 900 are executed by a processor of a computer. An example of a computer configured to execute the method 900 is computer system 1000 depicted and described in reference to FIG. 10.

Method 900 may begin at step 905 and proceed to step 910. At step 910, system 140 identifies one or more video clips 180 of a plurality of video clips 180 stored in storage device 150. In some embodiments, step 910 is executed in response to receiving a query 805 from user device 130. As explained above, query 805 may be a video clip search request associated with user-defined criteria. In some embodiments, the video clips 180 identified in response to query 805 match or substantially match the user-defined criteria. In some embodiments, the method 900 continues to a step 920 after identifying one or more video clips 180.

At step 920, system 140 receives a selection of the one or video clips identified at step 910. In some embodiments, the selection is a selection of indications of video clips 180 rather than a selection of video clips 180 themselves. For example, system 140 may, in some embodiments, communicate an indication of the one or more video clips 180 identified at step 910 to user device 130 and receive a user selection of one or more of the indications. In some embodiments, method 900 continues to step 930 after step 920.

At step 930, system 140 generates a rundown 815 that includes the one or more video clips 180 selected by user 120. In some embodiments, system 140 identifies, for each indication selected by user 120, a video clip 180 stored in storage device 150 and adds the video clip 180 to rundown 815. In some embodiments, method 900 continues to step 940 after generating rundown 815.

At step 940, system 140 determines whether each of the user-selected video clips 180 comply with one or more broadcasting requirements 190. In some embodiments, determining whether a user-selected video clip 180 is compliant with broadcasting requirements 190 first requires a determination about the broadcasting requirements 190 that are applicable to each user-selected video clip 180. For example, a broadcasting requirement 190 regarding inventory quantities may not be applicable to video clips 180 that are not associated with an item in inventory. As another example, a broadcasting requirement 190 regarding last broadcast date may apply to both video clips 180 associated and not-associated with an item in inventory. In some embodiments, the compliance determination of step 940 occurs at a pre-determined time prior to a specified broadcast date and/or time. For example, step 940 may occur upon determining that a broadcast date and/or time associated with rundown 815 is planned to occur in 2 hours. If system 140 determines at step 940 that each of the user-selected video clips 180 comply with applicable broadcasting requirements 190, the method 900 may proceed directly to step 950. If system 140 instead determines that one or more of the user-selected video clips 180 are not compliant with applicable broadcasting requirements, the method 900 may continue to step 945.

In step 945, system 140 replaces each user-selected video clip 180 determined to not be compliant with applicable broadcasting requirements 190 with an alternative video clip 180. As explained above, alternative video clips 180 may be selected and/or designated by user 120 and/or system 140. In some embodiments, the alternative video clips 180 that replace a non-compliant user-selected video clip 180 matches or substantially matches the user-defined criteria included in query 805 associated with the user-selected video clip 180. Although method 900 describes and depicts system 140 replacing user-selected video clip 180 at step 945, step 945 may include, in other embodiments, a notification to user device 130 to select alternative video clips to replace a user-selected video clip 180 that is determined at step 140 to not be compliant with applicable broadcasting requirements 190. In some embodiments, after each of the non-compliant user-selected video clips 180 have been replaced with alternative video clips 180, method 900 may proceed to step 950.

At step 950, system 140 generates a playlist 825. As explained above, playlist 825 comprises one or more video clips 180, each video clip 180 in playlist 825 being compliant with applicable broadcasting requirements 190. In some embodiments, playlist 825 includes the same video clips 180 that were selected by user 120 for the associated rundown. In other embodiments, playlist 825 includes one or more video clips 180 that were selected by user 120 for the associated rundown 815 in addition to one or more alternative video clips 180. Playlist 825 may be associated with a particular broadcast date and/or time and may, in some embodiments, be broadcast at, or approximately at (e.g., within 20 minutes of), the planned broadcast date and/or time. In some embodiments, method 900 proceeds to an end step 955 after generating playlist 825.

Although not depicted in FIGS. 1-10, this disclosure recognizes corresponding methods that may be executed by user device 130. For example, user device 130 may receive, from user 120, user-defined criteria corresponding to query 805 and communicate the user-defined criteria to system 140. After system 140 identifies, within one or more storage devices 150, one or more video clips 180 that match or substantially match the user-defined criteria of query 805, user device 130 may receive an indication of each of the video clips 180 identified by system 140 and present, on a display of user device 130, the indication of each video clip 180 identified by system 140. In some embodiments, the one or more video clips 180 identified by system 140 comply with broadcasting requirements 190. User device 130 may further be configured to receive from user 120 a selection of one or more of the indications and communicate the selected indications to system 140.

In other embodiments, user device 130 may be communicably coupled to one or more storage devices 150 storing the types of data explained above. In such an embodiment, system 140 may be software that is executable by user device 130. As such, user device 130 may be configured to execute the steps of method 900 in addition to being able to present interfaces (e.g., interfaces 200-700) to user 120 via user device 130.

Figure 10:
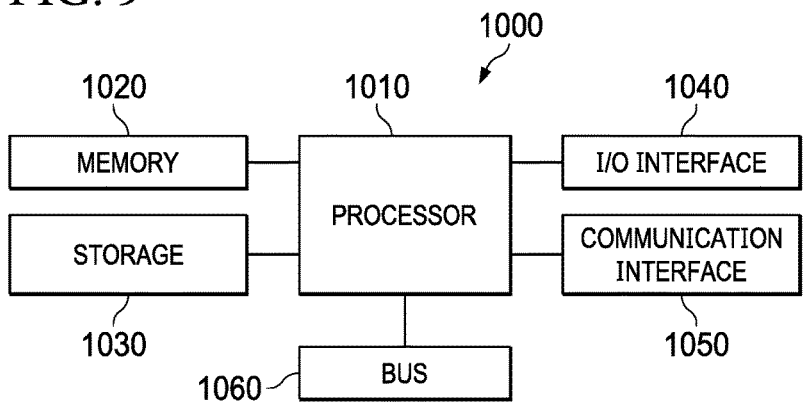
FIG. 10 is a block diagram of a computer configured to implement the method of FIG. 9, according to certain embodiments.

FIG. 10 illustrates an example computer system 1000. In some embodiments, system 140 and/or user device 130 may be a computer system such as computer system 1000 of FIG. 10. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1010, memory 1020, storage 1030, an input/output (I/O) interface 1040, a communication interface 1050, and a bus 1060. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1010 includes hardware for executing instructions, such as those making up a computer program. As an example and not by way of limitation, to execute instructions, processor 1010 may retrieve (or fetch) the instructions from an internal register, an internal cache, memory 1020, or storage 1030; decode and execute them; and then write one or more results to an internal register, an internal cache, memory 1020, or storage 1030. In particular embodiments, processor 1010 may include one or more internal caches for data, instructions, or addresses. This disclosure contemplates processor 1010 including any suitable number of any suitable internal caches, where appropriate. As an example and not by way of limitation, processor 1010 may include one or more instruction caches, one or more data caches, and one or more translation lookaside buffers (TLBs). Instructions in the instruction caches may be copies of instructions in memory 1020 or storage 1030, and the instruction caches may speed up retrieval of those instructions by processor 1010. Data in the data caches may be copies of data in memory 1020 or storage 1030 for instructions executing at processor 1010 to operate on; the results of previous instructions executed at processor 1010 for access by subsequent instructions executing at processor 1010 or for writing to memory 1020 or storage 1030; or other suitable data. The data caches may speed up read or write operations by processor 1010. The TLBs may speed up virtual-address translation for processor 1010. In particular embodiments, processor 1010 may include one or more internal registers for data, instructions, or addresses. This disclosure contemplates processor 1010 including any suitable number of any suitable internal registers, where appropriate. Where appropriate, processor 1010 may include one or more arithmetic logic units (ALUs); be a multi-core processor; or include one or more processors 1010. Although this disclosure describes and illustrates a particular processor, this disclosure contemplates any suitable processor.

In particular embodiments, memory 1020 includes main memory for storing instructions for processor 1010 to execute or data for processor 1010 to operate on. As an example and not by way of limitation, computer system 1000 may load instructions from storage 1030 or another source (such as, for example, another computer system 1000) to memory 1020. Processor 1010 may then load the instructions from memory 1020 to an internal register or internal cache. To execute the instructions, processor 1010 may retrieve the instructions from the internal register or internal cache and decode them. During or after execution of the instructions, processor 1010 may write one or more results (which may be intermediate or final results) to the internal register or internal cache. Processor 1010 may then write one or more of those results to memory 1020. In particular embodiments, processor 1010 executes only instructions in one or more internal registers or internal caches or in memory 1020 (as opposed to storage 1030 or elsewhere) and operates only on data in one or more internal registers or internal caches or in memory 1020 (as opposed to storage 1030 or elsewhere). One or more memory buses (which may each include an address bus and a data bus) may couple processor 1010 to memory 1020. Bus 1060 may include one or more memory buses, as described below. In particular embodiments, one or more memory management units (MMUs) reside between processor 1010 and memory 1020 and facilitate accesses to memory 1020 requested by processor 1010. In particular embodiments, memory 1020 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1020 may include one or more memories 1020, where appropriate. Although this disclosure describes and illustrates particular memory, this disclosure contemplates any suitable memory.

In particular embodiments, storage 1030 includes mass storage for data or instructions. As an example and not by way of limitation, storage 1030 may include a hard disk drive (HDD), a floppy disk drive, flash memory, an optical disc, a magneto-optical disc, magnetic tape, or a Universal Serial Bus (USB) drive or a combination of two or more of these. Storage 1030 may include removable or non-removable (or fixed) media, where appropriate. Storage 1030 may be internal or external to computer system 1000, where appropriate. In particular embodiments, storage 1030 is non-volatile, solid-state memory. In particular embodiments, storage 1030 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1030 taking any suitable physical form. Storage 1030 may include one or more storage control units facilitating communication between processor 1010 and storage 1030, where appropriate. Where appropriate, storage 1030 may include one or more storages 1030. Although this disclosure describes and illustrates particular storage, this disclosure contemplates any suitable storage.

In particular embodiments, I/O interface 1040 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1040 for them. Where appropriate, I/O interface 1040 may include one or more device or software drivers enabling processor 1010 to drive one or more of these I/O devices. I/O interface 1040 may include one or more I/O interfaces 1040, where appropriate. Although this disclosure describes and illustrates a particular I/O interface, this disclosure contemplates any suitable I/O interface.

In particular embodiments, communication interface 1050 includes hardware, software, or both providing one or more interfaces for communication (such as, for example, packet-based communication) between computer system 1000 and one or more other computer systems 1000 or one or more networks. As an example and not by way of limitation, communication interface 1050 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1050 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1050 for any of these networks, where appropriate. Communication interface 1050 may include one or more communication interfaces 1010, where appropriate. Although this disclosure describes and illustrates a particular communication interface, this disclosure contemplates any suitable communication interface.

In particular embodiments, bus 1060 includes hardware, software, or both coupling components of computer system 1000 to each other. As an example and not by way of limitation, bus 1060 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1060 may include one or more buses 1060, where appropriate. Although this disclosure describes and illustrates a particular bus, this disclosure contemplates any suitable bus or interconnect.

The components of computer system 1000 may be integrated or separated. In some embodiments, components of computer system 1000 may each be housed within a single chassis. The operations of computer system 1000 may be performed by more, fewer, or other components. Additionally, operations of computer system 1000 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system for publishing content for broadcast, the system comprising:
    one or more storage devices configured to store:
        data about a plurality of inventory items available for sale, the data for each inventory item of the plurality of inventory items comprising a duration of a video clip corresponding to the inventory item and an inventory amount corresponding to the inventory item available for sale;
        a plurality of video clips, wherein each video clip is associated with one of the plurality of inventory items available for sale; and
        a plurality of broadcasting requirements;
    a rundown generation engine communicably coupled to the one or more storage devices, the rundown generation engine configured to:
        identify, in response to a user query associated with a specified broadcast duration and a specified broadcast time, one or more video clips of the plurality of stored video clips;
        communicate, to a user associated with the user query, the one or more identified video clips;
        generate, based on a user selection of the one or more identified video clips, a rundown for the specified broadcast duration, the rundown comprising the user-selected video clips;
    a publication engine communicably coupled to the rundown generation engine and the one or more storage devices, the publication engine configured to:
        receive, from the rundown generation engine, the rundown for the specified broadcast duration;
        determine, at a pre-determined amount of time prior to the specified broadcast time, that each of the user-selected video clips comply with the one or more broadcasting requirements; and
        generate a playlist comprising each of the user-selected video clips of the rundown that comply with the plurality of broadcasting requirements, wherein the playlist is broadcast at approximately the specified broadcast time.

2. The system of claim 1, wherein the broadcasting requirements are based on one or more of:
    an amount in inventory of an inventory item;
    a price of an inventory item;
    a date of a last sale of an inventory item;
    a quality of a video clip corresponding to an inventory item; and an expiration date of a video clip corresponding to an inventory item.

3. The system of claim 1, wherein the data about the plurality of inventory items further comprises one or more of:
a price corresponding to an inventory item,
a date associated with an inventory item;
an identification of one or more videos corresponding to an inventory item; and
a quality of a video corresponding to an inventory item.

4. The system of claim 1, wherein the rundown generation engine is further configured to receive, based on a user-selection, an identification of one or more alternative video clips.

5. The system of claim 4, wherein the publication engine is further configured to substitute a user-selected video clip determined to not be in compliance with the one or more broadcasting requirements with one of the one or more alternative video clips.

6. The system of claim 1, wherein a total duration of the video clips in the generated playlist are approximately equivalent to the specified broadcast duration.

7. The system of claim 1, wherein the user query includes one or more of:
a specified inventory item; or
a specified duration.

8. The system of claim 1, wherein:
the one or more storage devices are further configured to store data about non-inventory items and a plurality of video clips corresponding to each non-inventory item; and
the rundown generated by the rundown generation engine comprises one or more video clips corresponding to one or more of the non-inventory items.

9. One or more computer-readable non-transitory storage media in one or more computing systems, the media embodying logic that is operable when executed to:
identify, in response to a user query associated with user-specified search criteria, one or more video clips of a plurality of video clips stored in one or more storage devices, wherein each video clip is associated with one of a plurality of inventory items available for sale;
display an indication of the one or more identified video clips;
generate, based on a user selection of the one or more identified video clips, a rundown comprising the user-selected video clips;
determine, at a time prior to a specified broadcast time, that each of the user-selected video clips comply with one or more broadcasting requirements; and
generate a playlist comprising each of the user-selected video clips of the rundown that comply with the one or more broadcasting requirements, wherein:
the playlist is associated with the specified broadcast time; and
the playlist is broadcast at approximately the specified broadcast time.

10. The media of claim 9, wherein the broadcasting requirements are based on one or more of:
an amount in inventory of an inventory item;
a price of an inventory item;
a date of a last sale of an inventory item;
a quality of a video clip corresponding to an inventory item; and
an expiration date of a video clip corresponding to an inventory item.

11. The media of claim 9, wherein the data about the plurality of inventory items further comprises one or more of:
a price corresponding to an inventory item,
a date associated with an inventory item;
an identification of one or more videos corresponding to an inventory item; and
a quality of a video corresponding to an inventory item.

12. The media of claim 9, the logic further operable when executed to:
identify an alternative video clip for a user-selected video clip determined to be not in compliance with the one or more broadcasting requirements; and
substitute the user-selected video clip determined to not be in compliance with the one or more broadcasting requirements with one the alternative video clip.

13. A system for publishing content for broadcast, the system comprising:
one or more processors configured to:
identify, in response to a user query, one or more video clips of a plurality of video clips stored in one or more storage devices wherein each video clip is associated with one of a plurality of inventory items available for sale;
display an indication of the one or more identified video clips;
generate, based on a user selection of the one or more identified video clips, a rundown comprising the user-selected video clips;
determine, at a time prior to a specified broadcast time, that each of the user-selected video clips comply with a plurality of broadcasting requirements stored in the one or more storage devices; and
generate a playlist comprising each of the user-selected video clips of the rundown that comply with the plurality of broadcasting requirements, wherein:
the playlist is associated with the specified broadcast time; and
the playlist is broadcast at approximately the specified broadcast time.

14. The system of claim 13, wherein the broadcasting requirements are based on one or more of:
an amount in inventory of an inventory item;
a price of an inventory item;
a date of a last sale of an inventory item;
a quality of a video clip corresponding to an inventory item; and
an expiration date of a video clip corresponding to an inventory item.

15. The system of claim 13, wherein the data about the plurality of inventory items further comprises one or more of:
a price corresponding to an inventory item,
a date associated with an inventory item;
an identification of one or more videos corresponding to an inventory item; and
a quality of a video corresponding to an inventory item.

16. The system of claim 13, wherein the one or more processors are further configured to:
identify an alternative video clip for a user-selected video clip determined to be not in compliance with the one or more broadcasting requirements; and
substitute the user-selected video clip determined to not be in compliance with the one or more broadcasting requirements with one the alternative video clip.

* * * * *